US011155199B2

(12) United States Patent
Pansegrouw

(10) Patent No.: US 11,155,199 B2
(45) Date of Patent: Oct. 26, 2021

(54) DUNNAGE BAG ARRANGEMENT

(71) Applicant: Stopak India Pvt. Ltd., Bangalore (IN)

(72) Inventor: Bester Jacobus Pansegrouw, Ottery (ZA)

(73) Assignee: Stopak India Pvt. Ltd., Bangalore (IN)

( * ) Notice: Subject to any disclaimer, the term of this patent is extended or adjusted under 35 U.S.C. 154(b) by 169 days.

(21) Appl. No.: 16/738,336

(22) Filed: Jan. 9, 2020

(65) Prior Publication Data

US 2020/0148091 A1 May 14, 2020

Related U.S. Application Data

(60) Division of application No. 15/897,717, filed on Feb. 15, 2018, now Pat. No. 10,562,437, which is a
(Continued)

(30) Foreign Application Priority Data

Jun. 21, 2013 (ZA) .................................. 2013/04659

(51) Int. Cl.
*B60P 7/08* (2006.01)
*B60P 7/06* (2006.01)
(Continued)

(52) U.S. Cl.
CPC ............... *B60P 7/065* (2013.01); *B60P 7/135* (2013.01); *B60P 7/14* (2013.01); *B60P 7/16* (2013.01); *B60P 7/18* (2013.01); *B61D 45/00* (2013.01); *B61D 45/001* (2013.01); *B61D 45/002* (2013.01); *B61D 45/008* (2013.01); *B63B 25/24* (2013.01); *B65D 81/05* (2013.01);
(Continued)

(58) Field of Classification Search
CPC .. B60P 7/065; B60P 7/135; B60P 7/14; B60P 7/16; B60P 7/18; B65D 81/052; B65D 2581/051
USPC .......................... 410/119, 125, 128, 154, 155
See application file for complete search history.

(56) References Cited

U.S. PATENT DOCUMENTS 2,990,070 A 6/1961 Cushman
3,028,981 A 4/1962 Ford et al.
(Continued)

FOREIGN PATENT DOCUMENTS

CA 2254253 C 6/2004
EP 0924140 A1 6/1999
(Continued)

OTHER PUBLICATIONS

"International Search Report", PCT/IB2014/062197 (5 pages), dated Sep. 3, 2014.

*Primary Examiner* — Stephen T Gordon
(74) *Attorney, Agent, or Firm* — Neal, Gerber & Eisenberg LLP

(57) ABSTRACT

The invention discloses a dunnage bag arrangement for securing loads, includes an inflatable dunnage bag having a gastight inflatable bladder; and a hanger member connected to the dunnage bag and adapted to being supported on top of loads and adapted to support the dunnage bag in a void between loads. The dunnage bag includes a reinforcing sleeve made of at least one material ply, the sleeve having a first opening and a second opening, and the sleeve being folded and sealed and/or stitched to close off at least one of the openings.

14 Claims, 2 Drawing Sheets

Related U.S. Application Data continuation of application No. 14/898,822, filed as application No. PCT/IB2014/062197 on Jun. 13, 2014, now Pat. No. 9,896,256.

(51) Int. Cl.

| | | |
|---|---|---|
| *B61D 45/00* | (2006.01) | |
| *B60P 7/135* | (2006.01) | |
| *B60P 7/18* | (2006.01) | |
| *B63B 25/24* | (2006.01) | |
| *B65D 81/05* | (2006.01) | |
| *B60P 7/16* | (2006.01) | |
| *B60P 7/14* | (2006.01) | |
| *B65D 81/107* | (2006.01) | |
| *B65D 81/113* | (2006.01) | |

(52) U.S. Cl.
CPC ......... *B65D 81/051* (2013.01); *B65D 81/107* (2013.01); *B65D 81/113* (2013.01)

(56) References Cited

U.S. PATENT DOCUMENTS

| | | | |
|---|---|---|---|
| 3,072,270 A | 1/1963 | Tolby et al. | |
| 3,131,648 A | 5/1964 | Seger | |
| 3,145,853 A | 8/1964 | Langenberg | |
| 3,199,689 A | 8/1965 | Feldkamp | |
| 3,442,402 A | 5/1969 | Baxter | |
| 3,554,135 A | 1/1971 | Duvall et al. | |
| 3,643,268 A | 2/1972 | Stamberger | |
| 3,667,625 A | 6/1972 | Lucas | |
| 3,868,026 A | 2/1975 | Baxter | |
| 3,939,995 A | 2/1976 | Baxter | |
| 4,102,364 A | 7/1978 | Leslie et al. | |
| 4,116,344 A | 9/1978 | Ziemba | |
| 4,136,788 A | 1/1979 | Robbins | |
| 4,349,303 A * | 9/1982 | Liebel | B60P 7/18 410/154 |
| 5,139,842 A | 8/1992 | Sewell | |
| 5,678,969 A * | 10/1997 | Farrell | B60P 7/16 410/119 |
| 5,730,564 A | 3/1998 | Howlett, Jr. | |
| 5,868,534 A | 2/1999 | Goshorn et al. | |
| 5,908,275 A | 6/1999 | Howlett et al. | |
| 6,095,732 A | 8/2000 | Howlett et al. | |
| 6,149,362 A | 11/2000 | Berrier et al. | |
| 6,186,714 B1 | 2/2001 | Berrier et al. | |
| 6,220,800 B1 | 4/2001 | Elze et al. | |
| 6,527,488 B2 | 3/2003 | Elze et al. | |
| D499,637 S | 12/2004 | Elze et al. | |
| 7,011,480 B2 | 3/2006 | Ahlert et al. | |
| 7,128,510 B2 | 10/2006 | Ahlert et al. | |
| 7,137,765 B1 | 11/2006 | Elze et al. | |
| 7,905,693 B2 * | 3/2011 | Ramirez | B60P 7/065 410/119 |
| 7,909,554 B2 | 3/2011 | Keenan et al. | |
| 9,545,872 B1 | 1/2017 | Wilson et al. | |
| 9,896,256 B2 | 2/2018 | Pansegrouw | |
| 10,562,437 B2 * | 2/2020 | Pansegrouw | B60P 7/16 |
| 2002/0136614 A1 | 9/2002 | Elze et al. | |
| 2004/0141824 A1 | 7/2004 | Ahlert et al. | |
| 2004/0181156 A1 | 9/2004 | Kingsford et al. | |
| 2006/0239791 A1 | 10/2006 | Morris | |
| 2009/0116927 A1 | 5/2009 | Keenan et al. | |

FOREIGN PATENT DOCUMENTS

| | | |
|---|---|---|
| EP | 0978461 A1 | 2/2000 |
| WO | 03078251 A2 | 9/2003 |

\* cited by examiner

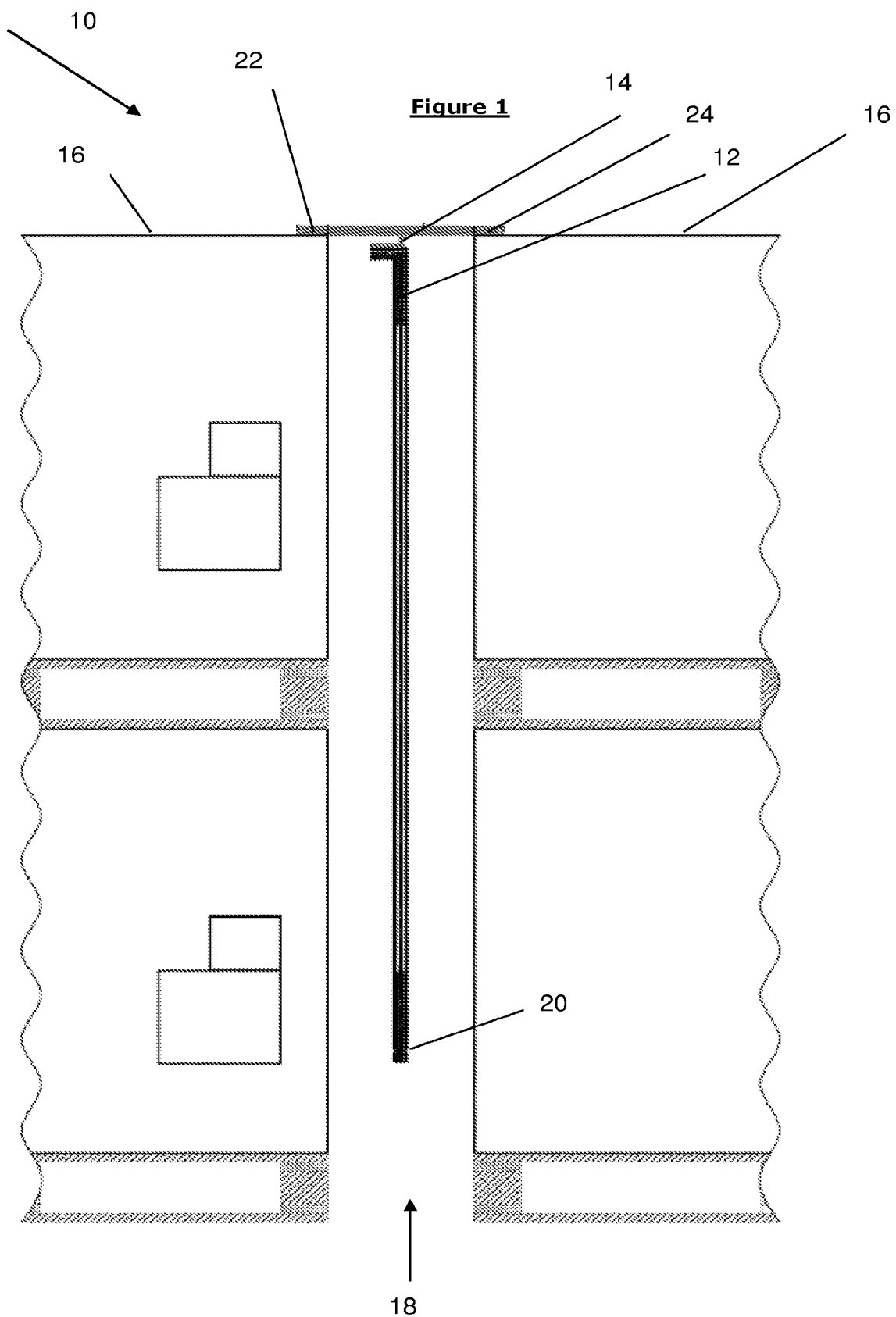

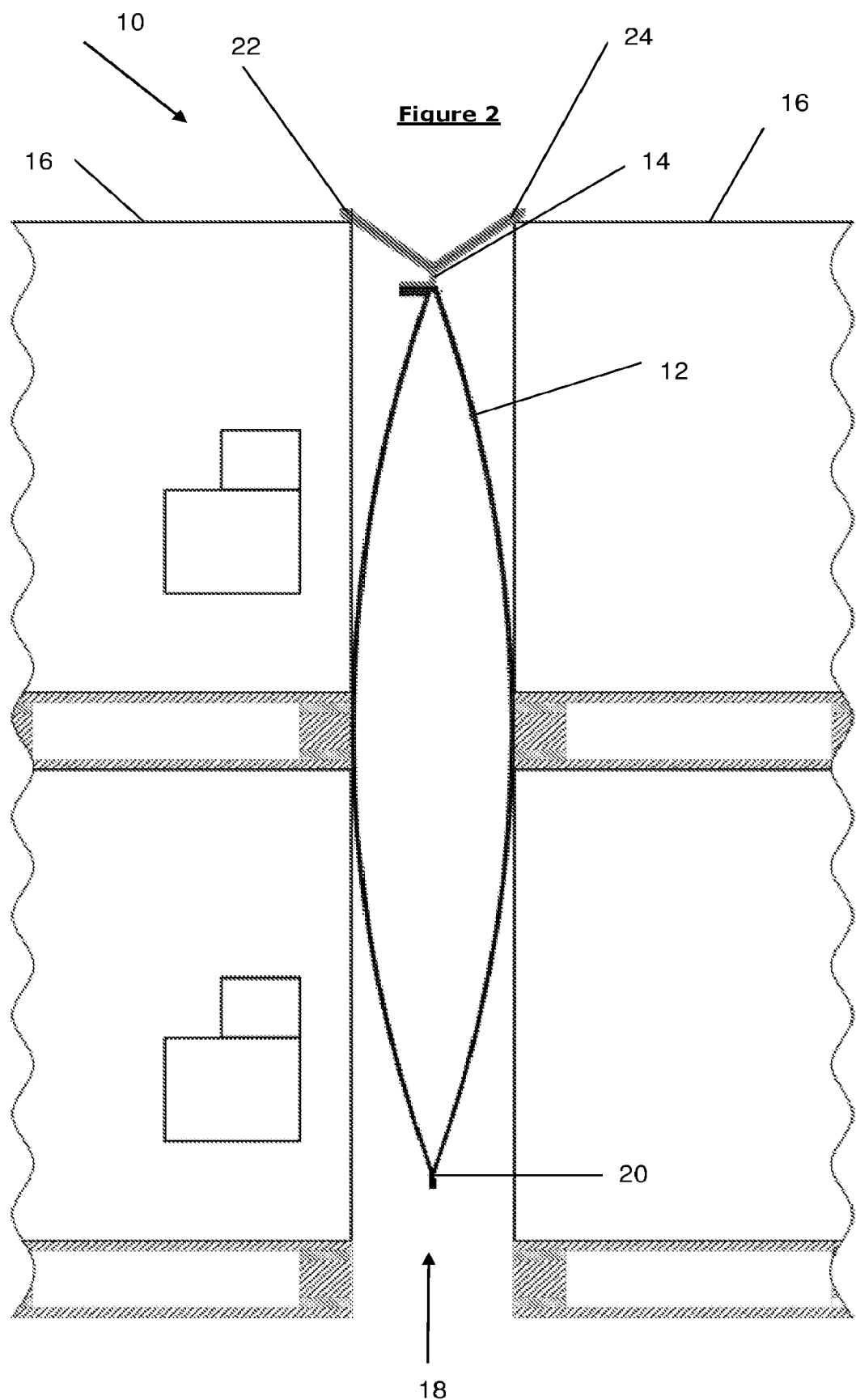

DUNNAGE BAG ARRANGEMENT

PRIORITY CLAIM

This application is a divisional of, claims priority to and the benefit of U.S. patent application Ser. No. 15/897,717, filed on Feb. 15, 2018 as a continuation of U.S. patent application Ser. No. 14/898,822, filed on Dec. 16, 2015 as a 371(c) Application of PCT/IB2014/062197, filed on Jun. 13, 2014, and now U.S. Pat. No. 9,896,256, which issued on Feb. 20, 2018, which claims priority to and the benefit of South Africa Patent Application No. 2013/04659, filed on Jun. 21, 2013, the entire contents of each of which are incorporated by reference herein.

FIELD OF INVENTION

The present invention relates to a dunnage bag arrangement. More particularly, the present invention relates to an inflatable dunnage bag arrangement.

BACKGROUND TO INVENTION

Conventional inflatable and disposable dunnage bags include a gastight bladder, usually constructed from polyethylene material, surrounded by an outer protective and supportive casing consisting of at least one ply of paper material. These dunnage bags are used to fill spaces between cargo or between the cargo and the walls of the freight carries in order to prevent the cargo from shifting and damaging either the cargo itself and/or the walls of the freight carrier. The dunnage bags are typically placed between the cargo in a deflated condition and are subsequently inflated with a gas. The pressure of the gas in the dunnage bags is determined by the application, the size and wall composition of the dunnage bags.

The problem with known dunnage bags is that when in the deflated position they slump together and are not correctly positioned or thrown in the void where they need to be inflated with the result that the inflated dunnage bag docs not perform its function adequately. Hence currently when a dunnage bag is used, especially a long bag, it tends to flop around until it starts to be inflated. The disadvantages are that it is frustrating for the operator, is time consuming, sometimes the bag has to be deflated to reposition correct and sometimes it take two operators to position a bag It is an object of the invention to suggest a dunnage bag arrangement, which will assist in overcoming these problems.

SUMMARY OF INVENTION

According to the invention, a dunnage bag arrangement for securing loads, includes
(a) an inflatable dunnage bag having a gastight inflatable bladder; and
(b) a hanger member connected to the dunnage bag and adapted to being supported on top of loads and adapted to support the dunnage bag in a void between loads.

Also according to the invention, a method of securing load, includes the steps
(a) of providing in a void between loads to be secured, an inflatable dunnage bag having a gastight inflatable bladder;
(b) of supporting the inflatable dunnage bag in the void between the loads by means of a hanger member connected to the dunnage bag, the hanger member being adapted to being supported on top of the load; and
(c) of inflating the inflatable dunnage bag to secure the loads.

The dunnage bag may include a reinforcing sleeve made of at least one material ply, the sleeve having a first opening and a second opening, and the sleeve being folded and sealed and/or stitched to close off at least one of the openings.

The size of the hanger member may be adjustable.

The size of the hanger member may depend on the size of the load application and/or the size of the void.

The hanger member may include at least two wing members.

The hanger member and/or the wing members may consist of a rigid material and/or may consist of a plastics material or metal.

The hanger member may be removably connected to the dunnage bag.

The hanger member may be re-usable.

The hanger member may be a hanger type extension to the dunnage bag so that it operates like wings and that these wings then rest on top of the load.

The sleeve may be made of at least one material ply selected from the material group consisting of paper, plastics material, woven PP (polypropylene), HDPE (high-density polyethylene) and PVC (polyvinylchloride).

The sleeve ends may consist of flaps formed by cutting the sleeve at the opening being closed.

The flaps at one end may be folded towards each other to close off the respective opening and/or at one end may be glued to each other to permanently close off the respective opening.

The dunnage bag may be provided with one to six plies of paper sleeves.

The inflatable bladder may be made of polyethylene.

The inflatable bladder may be provided with an inflation valve.

The inflation valve may protrude to the exterior at one of the openings.

The dunnage bag may be adapted to be used in voids larger than 12 inches and/or the void may be smaller than 40 inches.

The dunnage bag may be substantially rectangular in shape.

The dunnage bag may be disposable.

The dunnage bag may be applicable in conjunction with void fillers and/or be applicable in conjunction with friction panels.

At least 50% of the exterior surface area of the dunnage bag may be adapted to be in contact with a load to be secured.

The contact may be direct and/or indirect.

BRIEF DESCRIPTION OF DRAWINGS

The invention will now be described by way of example with reference to the accompanying schematic drawings.

In the drawings there is shown in:

FIG. 1: a sectional side view of the dunnage bag arrangement according to the invention in position hanging between four pallets before being inflated; and FIG. 2: a sectional side of the dunnage bag arrangement shown in FIG. 1 after being inflated.

DETAILED DESCRIPTION OF DRAWINGS

Referring to the drawings, there is shown a dunnage bag arrangement in accordance with the invention. The dunnage bag arrangement 10 for securing loads, includes an inflatable dunnage bag 12 having a gastight inflatable bladder, and a hanger member 14 connected to the dunnage bag 12 and adapted to being supported on top of loads 16 and adapted to support the dunnage bag 12 in a void 18 between loads 16. The dunnage bag 12 includes a reinforcing sleeve made of at least one material ply, the sleeve having a first opening and a second opening, and the sleeve being folded and sealed and/or stitched to close off at least one of the openings 20. The size of the hanger member 14 can be adjustable. The size of the hanger member 14 depends on the size of the load application and the size of the void 18.

The hanger member 14 includes two wing members 22 and 24. The hanger member 14 and the wing members 22 and 24 consist of a rigid material. The hanger member 14 and the wing members 22 and 24 consist of a plastics material or metal. The hanger member 14 is removably connected to the dunnage bag 12 and is thus reusable. The hanger member 14 is a hanger type extension to the dunnage bag 12 so that it operates like wings and that these wings then rest on top of the load 16. The sleeve is made of at least one material ply selected from the material group consisting of paper, plastics material, woven PP (polypropylene), HDPE (high-density polyethylene) and PVC (polyvinylchloride). The sleeve ends consist of flaps formed by cutting the sleeve at the opening being closed. The flaps at one end are folded towards each other to close off the respective opening. The flaps at one end are glued to each other to permanently close off the respective opening.

The dunnage bag arrangement 10 can be provided with one to six plies of paper sleeves. The inflatable bladder is made of polyethylene. The inflatable bladder is provided with an inflation valve. The inflation valve protrudes to the exterior at one of the openings. The dunnage bag arrangement 10 can be used in voids larger than 12 inches. The void can also be smaller than 40 inches. The dunnage bag arrangement 10 can be substantially rectangular in shape. The dunnage bag arrangement 10 can be disposable. The dunnage bag arrangement 10 is applicable in conjunction with void fillers. The dunnage bag arrangement 10 is applicable in conjunction with friction panels. At least 50% of the exterior surface area of the dunnage bag 12 can be adapted to be in contact with a load to be secured. The contact can be direct or indirect.

Hence the dunnage bag arrangement 10 according to the invention, provides a method of securing load, which includes the steps of providing in a void 18 between loads 16 to be secured, an inflatable dunnage bag 12 having a gastight inflatable bladder; of supporting the inflatable dunnage bag 12 in the void 18 between the loads 16 by means of a banger member 14 connected to the dunnage bag 12, the hanger member 14 being adapted to being supported on top of the load 16; and of inflating the inflatable dunnage bag 12 to secure the loads 16. This ensures the following correct positioning of the bag 12 therefore less chances of damage; is less time consuming; and requires only one operator.

What I claim is:

1. A method for securing a first load and a second load with a dunnage bag arrangement comprising a deformable support connected to a dunnage bag, the method comprising:
   positioning the support on the first load and the second load so the support extends across a void between the first load and the second load and suspends the dunnage bag at least partially within the void; and
   inflating the dunnage bag so the dunnage bag expands and contacts the first and second loads, thereby causing the support to deform.

2. The method of claim 1, wherein the dunnage bag comprises a sleeve and an inflatable bladder within the sleeve, wherein inflating the dunnage bag comprises inflating the inflatable bladder so the sleeve contacts the first and second loads.

3. The method of claim 1, wherein the support comprises a first wing member and a second wing member, wherein positioning the support on the first load and the second load comprises positioning the first wing member on the first load and the second wing member on the second load.

4. The method of claim 3, wherein positioning the first wing member on the first load and the second wing member on the second load further comprises positioning first portions of the first and second wing members on the first and second loads, respectively.

5. The method of claim 4, wherein positioning the first wing member on the first load and the second wing member on the second load further comprises positioning second portions of the first and second wing members above the void.

6. The method of claim 5, wherein inflating the dunnage bag causes the second portions of the wing members to move into the void.

7. The method of claim 3, wherein positioning the first wing member on the first load and the second wing member on the second load further comprises positioning the first wing member on the first load and not on the second load and positioning the second wing member on the second load and not the first load.

8. The method of claim 3, wherein the first and second wing members are parallel to one another before the dunnage bag has been inflated.

9. The method of claim 8, wherein the first and second wing members are not parallel to one another after the dunnage bag has been inflated.

10. The method of claim 3, wherein the first and second wing members are rigid.

11. The method of claim 1, wherein inflating the dunnage bag causes the support to deform so at least part of the support moves toward the void.

12. The method of claim 1, wherein the dunnage bag arrangement further comprises a hanger member connecting the support to the dunnage bag.

13. The method of claim 12, wherein the hanger member is rigid.

14. The method of claim 12, further comprising removing the hanger member from the dunnage bag after the dunnage bag has been inflated.

* * * * *